United States Patent
Singerl et al.

(10) Patent No.: US 9,520,923 B2
(45) Date of Patent: Dec. 13, 2016

(54) LOW-COMPLEXITY ACPR-ENHANCING DIGITAL RF MIMO TRANSMITTER

(71) Applicant: Infineon Technologies AG, Neubiberg (DE)

(72) Inventors: Peter Singerl, Villach (AT); David Seebacher, Villach (AT); Thomas Magesacher, Villach (AT); Franz Dielacher, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/704,294

(22) Filed: May 5, 2015

(65) Prior Publication Data
US 2016/0329935 A1    Nov. 10, 2016

(51) Int. Cl.
| | |
|---|---|
| H04B 7/04 | (2006.01) |
| H04B 1/04 | (2006.01) |
| H04L 27/20 | (2006.01) |
| H04L 25/49 | (2006.01) |

(52) U.S. Cl.
CPC .......... *H04B 7/0413* (2013.01); *H04B 1/0475* (2013.01); *H04B 1/0483* (2013.01); *H04L 25/4902* (2013.01); *H04L 27/205* (2013.01)

(58) Field of Classification Search
CPC ... H04B 7/0413; H04B 1/0475; H04B 1/0483; H04L 27/205; H04L 25/4902
See application file for complete search history.

(56) References Cited

U.S. PATENT DOCUMENTS

| | | | | |
|---|---|---|---|---|
| 2005/0033168 | A1* | 2/2005 | Shifrin | G01S 7/52017 600/437 |
| 2009/0034603 | A1* | 2/2009 | Lakdawala | H03F 3/2178 375/238 |
| 2010/0073102 | A1* | 3/2010 | Singerl | H03K 7/08 332/108 |

OTHER PUBLICATIONS

"Pseudo-Natural Pulse Width Modulation for High Accuracy Digital-to-Analogue Conversion"; Electronics Letters, vol. 27, No. 16, Aug. 1, 1991, p. 1491-1492.
J.M. Goldberg, et al.; "New High Accuracy Pulse Width Modulation Based Digital-to-Analogue Converter/Power Amplifier"; IEEE Proc.-Circuits Devices Systems, vol. 141, No. 4, Aug. 1994, p. 315-324.

(Continued)

*Primary Examiner* — Vineeta Panwalkar
(74) *Attorney, Agent, or Firm* — Eschweiler & Associates, LLC (57) ABSTRACT

The present disclosure relates to a low-complexity transmitter architecture that drives phase modulators with digital signals to generate a pulse width modulated (PWM) signal that is transmitted by an antenna. In some embodiments, the system has a pre-processing element that generates first and second digital control signals from a digital baseband signal. A first phase modulation component introduces a first phase shift into a first local oscillator signal based upon the first control signal and generates a first digital signal corresponding to the first phase shift. A second phase modulation component introduces a second phase shift into the first local oscillator signal based upon the second control signal and generates a second digital signal corresponding to the second phase shift. A combination element is configured to combine the first and second digital output signals to generate an RF pulse width modulated (RF-PWM) signal.

18 Claims, 6 Drawing Sheets

(56) References Cited

OTHER PUBLICATIONS

Pieter A. J. Nuyts, et al.; "A Fully Digital Delay Line Based GHz Range Multimode Transmitter Front-End in 65-nm CMOS"; IEEE Journal of Solid-State Circuits, vol. 47, No. 7, Jul. 2012, p. 1681-1692.

Ashoke Ravi, et al.; "A 2.4-GHz 20-4-MHz Channel WLAN Digital Outphasing Transmitter Utilizing a Delay-Based Wideband Phase Modulator in 32-nm CMOS"; IEEE Journal of Solid-State Circuits, vol. 47, No. 12, Dec. 2012, p. 3184-3196.

David Seebacher, et al.; "Reduction of Aliasing Effects of RF PWM Modulated Signals by Cross Point Estimation"; IEEE Transactions on Circuits and Systems-I: Regular Papers, vol. 61, No. 11, Nov. 2014, p. 3184-3192.

\* cited by examiner

LOW-COMPLEXITY ACPR-ENHANCING DIGITAL RF MIMO TRANSMITTER

BACKGROUND

Many modern day electronic devices (e.g., computers, cell phones, radar, etc.) communicate wirelessly with other electronic devices. Electronic devices typically use radio frequency (RF) transmitters to generate wireless signals at radio frequencies (e.g., 3 kHz to 300 GHz). The RF transmitters typically perform modulation to up-convert a frequency of a baseband signal to an RF signal. The RF signal is subsequently transmitted by an antenna as electromagnetic radiation.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Traditionally, wireless communication systems have used a single antenna to wirelessly transmit and/or receive wireless signals. However, in many emerging wireless communication systems (e.g., 5G), base stations use multiple antennas array (e.g., MIMO and/or massive MIMO antenna arrays) to transmit and/or receive wireless signals. Multiple antennas arrays can be used to combine individual RF data streams in air in a desired direction without mechanically moving transmitting antennas. Combining individual RF data streams in air offers a number of advantages over traditional systems, including high data rates, improved link quality (e.g., low out-of-band distortion), reliability, and beamforming to spatially focus energy.

Multiple antennas arrays often use a separate transmitter to drive each antenna. Therefore, systems having a large number of antennas (e.g., hundreds of antennas) require a large number of transmitters/receivers. However, such transmitters/receivers can be complex. For example, traditional heterodyne or homodyne transmitters use high performance digital-to-analog converters (DAC's) to convert a digital baseband signal to an analog signal, and analog mixers to then mix the analog signal with a local oscillator (LO) signal to convert the digital baseband signal to an RF signal that can be transmitted by an antenna. The use of many complex transmissions chain makes multiple antenna systems expensive to build and operate.

Accordingly, the present disclosure relates to a low-complexity transmitter architecture that drives phase modulators with digital signals to generate a pulse width modulated (PWM) signal that is transmitted by an antenna. In some embodiments, the system comprises a pre-processing element configured to generate first and second digital control signals from a digital baseband signal. A first phase modulation component is configured to introduce a first phase shift into a first local oscillator signal based upon the first control signal and to generate a first digital signal corresponding to the first phase shift. A second phase modulation component is configured to introduce a second phase shift into the first local oscillator signal based upon the second control signal and to generate a second digital signal corresponding to the second phase shift. A combination element is configured to combine the first and second digital output signals to generate a pulse width modulated (RF-PWM) signal. By using the phase modulation component to generate digital output signals, the disclosed RF transmitter architecture is simpler than traditional heterodyne and homodyne architectures, thereby enabling their use in multiple antenna arrays (e.g., MIMO, massive MIMO, etc.) used in future communication standards (e.g., 5G).

Figure 1:
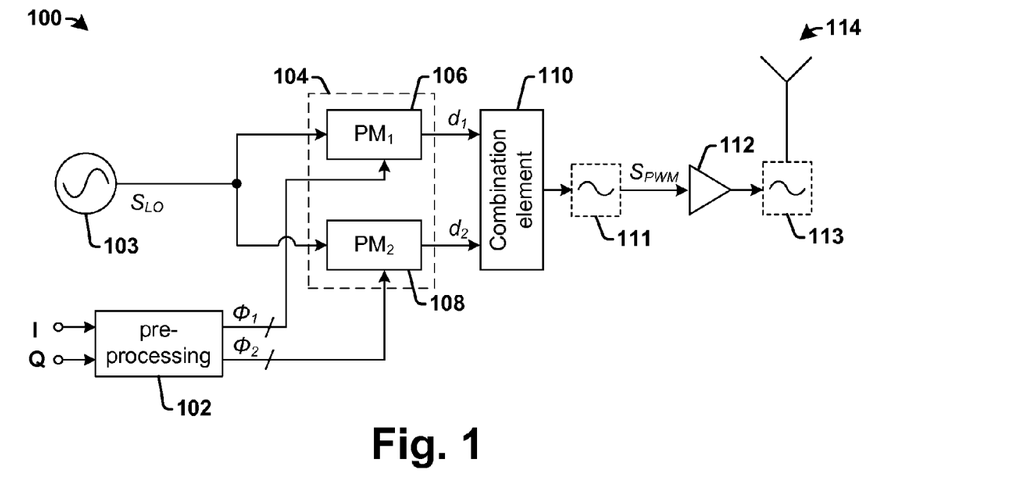
FIG. 1 is a block diagram of some embodiments of a transmission chain that uses phase component to generate an RF pulse width modulated (PWM) signal from a digital baseband signal.

FIG. 1 is a block diagram of some embodiments of a transmission chain 100 having a plurality of phase modulation components configured to generate a RF pulse width modulated (PWM) digital output signal.

The transmission chain 100 comprises a pre-processing element 102. The pre-processing element 102 is configured to receive a digital baseband signal. In some embodiments, the digital baseband signal may comprise in-phase (I) components and quadrature phase (Q) components, having a 90° phase shift therebetween. The pre-processing element 102 is configured to generate a first control signal $\phi_1$ and a second control signal $\phi_2$ from the digital baseband signal. The first and second control signals, $\phi_1$ and $\phi_2$, may comprise multi-bit digital control signals.

The transmission chain 100 comprises a phase modulation element 104. The phase modulation element 104 is configured to encode phase modulation information corresponding to the digital baseband signal onto digital signals through phase modulation of a local oscillator signal $S_{LO}$. The phase modulation element 104 comprises a first phase modulation component 106 and a second phase modulation component 108 arranged in parallel. In some embodiments, the first phase modulation component 106 and the second phase modulation component 108 may comprise passive delay elements. In other embodiments, the first phase modulation component 106 and the second phase modulation component 108 may comprise an active inverter.

The first phase modulation component 106 is configured to receive the local oscillator signal $S_{LO}$ from a local oscillator 103 and the first control signal $\phi_1$ from the pre-processing element 102. The second phase modulation component 108 is configured to receive the local oscillator signal $S_{LO}$ from the local oscillator 103 and the second control signal $\phi_2$ from the pre-processing element 102. The phase modulation element 104 is configured to modulate a phase of the local oscillator signal $S_{LO}$ based on the first and second control signals, $\phi_1$ and $\phi_2$, and to generate digital signals, $d_1$ and $d_2$, from the phase modulated local oscillator signals. For example, based upon the first control signal $\phi_1$, the first phase modulation component 106 is configured to introduce a first phase shift into the local oscillator signal $S_{LO}$ and to generate a first digital signal $d_1$ corresponding to the first phase shift. Similarly, based upon the second control signal $\phi_2$, the second phase modulation component 108 is configured to introduce a second phase shift into the local oscillator signal $S_{LO}$ and to generate a second digital signal $d_2$ corresponding to the second phase shift. In some embodiments, the digital signals, $d_1$ and $d_2$, may comprise 1-bit digital signals having an even duty cycle (50 percent on/50 percent off).

The first and second digital signals, $d_1$ and $d_2$, are provided to a combination element 110, which is configured to combine the first and second digital signals, $d_1$ and $d_2$, to generate a radio frequency pulse width and pulse position (phase) modulated (RF-PWM) signal $S_{PWM}$. In some embodiments, the combination element 110 may comprise a logic gate (e.g., an AND gate, a NAND gate, etc.). The RF-PWM signal $S_{PWM}$ output from the combination element 110 may be a 1-bit signal having pulses with an uneven duty cycle. The position of the pulses (e.g., the shift of the pulses relative to the LO signal) is based on the phase information of the digital baseband signal, while the duty cycle of the pulses (i.e., the width of the pulses) is based upon the amplitude information of the digital baseband signal. For example, for a local oscillator signal $S_{LO}$ having a frequency of 1 GHz, a 1 ns frame of the RF-PWM signal $S_{PWM}$ will have one non-contiguous pulse. The width of the pulse is related to the amplitude of the digital baseband signal and the position of the pulse within the 1 nm frame is related to the phase of the digital baseband signal.

The RF-PWM signal $S_{PWM}$ is output from the combination element 110 to an antenna 114, which is configured to wirelessly transmit the RF-PWM signal $S_{PWM}$ as electromagnetic radiation. In some embodiments, a power amplifier 112 may be arranged between the combination element 110 and the antenna 114. The power amplifier 112 is configured to increase a power of the signal output by the antenna 114. In various embodiments, filtering elements, 111 and 113, may be arranged upstream and/or downstream of the power amplifier 112. For example, in some embodiments, an upstream filtering element 111 may be arranged upstream of the power amplifier 112. The upstream filtering element 111 may comprise a bandpass filter configured to filter the PWM signal $S_{PWM}$ before it is amplified by the power amplifier 112 (e.g., a class-B amplifier, a class-AB amplifier, a Doherty amplifier, etc.) In other embodiments, a downstream filtering element 113 may be arranged downstream of the power amplifier 112. The downstream filtering element may comprise a bandpass filter configured to filter the PWM signal $S_{PWM}$ output from a power amplifier 112 that directly amplifies the PWM signal $S_{PWM}$ (e.g., a switched mode power amplifier).

Figure 2:
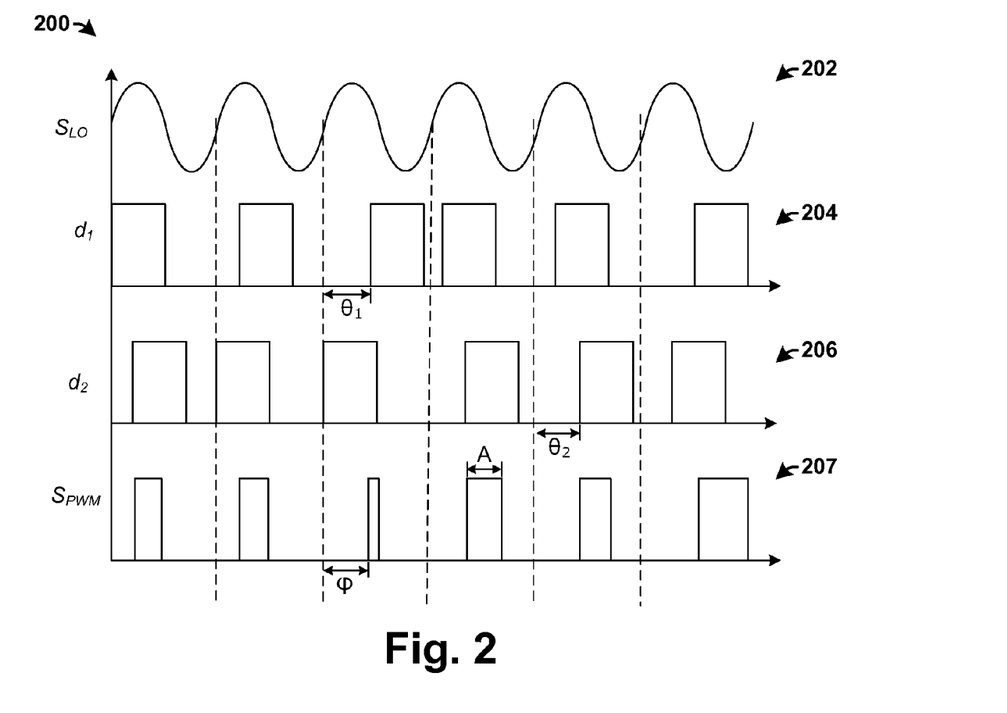
FIG. 2 is a timing diagram illustrating exemplary signals corresponding to the transmission chain of FIG. 1.

FIG. 2 is a timing diagram 200 illustrating exemplary graphs of signals corresponding to the transmission chain of FIG. 1.

Graph 202 illustrates an exemplary local oscillator signal $S_{LO}$. The local oscillator signal $S_{LO}$ is a sinusoidal signal that varies at a local oscillator frequency that is equal to 1/the period of the signal. In alternative embodiments, the local oscillator signal $S_{LO}$ may comprise a rectangular signal.

Graph 204 illustrates an exemplary first digital signal $d_1$ output from a first phase modulation component. The first digital signal $d_1$ comprises a 1-bit output signals with pulses having a constant duty cycle that is 50 percent on and 50 percent off. The first digital signal $d_1$ is generated by introducing a first phase shift $\theta_1$ into the local oscillator signal $S_{LO}$ according to a first control signal $\phi_1$. The first phase shift $\theta_1$ causes the pulse to have a position that depends upon a phase of an I/O baseband signal (received at pre-processing element 102), I(t)+iQ(t). For example, in some embodiments, first phase shift $\theta_1$ may have a value that is substantially equal to the $\tan^{-1}(Q/I)+\cos^{-1}(\text{sqrt}(I^2+Q^2)/2)$.

Graph 206 illustrates an exemplary second digital signal $d_2$ output from a second phase modulation component. The second digital signal $d_2$ comprises a 1-bit output signals with pulses having a constant duty cycle that is 50 percent on and 50 percent off. The second digital signal $d_2$ is generated by introducing a second phase shift $\theta_2$ into the local oscillator signal $S_{LO}$ according to a second control signal $\phi_2$. The second phase shift $\theta_2$ causes the pulse to have a position that depends upon a phase of the I/Q baseband signal (received at pre-processing element 102). For example, in some embodiments, the second phase shift $\theta_2$ may have a value that is substantially equal to the $\tan^{-1}(Q/I)-\cos^{-1}(\text{sqrt}(I^2+Q^2)/2)$.

Graph 207 illustrates a RF-PWM signal $S_{PWM}$. The RF-PWM signal $S_{PWM}$ is formed by operating a logic function (e.g., an AND function) on the first digital signal $d_1$ and the second digital signal $d_2$. Combining the first digital signal $d_1$ and the second digital signal $d_2$ (e.g., rectangular signals with a constant duty cycle of 50 percent on/50 percent off) recovers amplitude information of the I/Q baseband signal, so that the RF-PWM signal $S_{PWM}$ has varying pulse widths A (i.e., with varying duty cycles) that correspond to an amplitude of the I/Q baseband signal and varying phase shifts $\phi$ that correspond to a phase of the I/Q baseband signal. In some embodiments, the pulse width A of the RF-PWM signal $S_{PWM}$ has a value that is equal to the square root of $(I^2+Q^2)$ and the phase shift $\phi$ of the RF-PWM signal $S_{PWM}$ has a value that is equal to $\tan^{-1}(I/Q)$.

Figure 3:
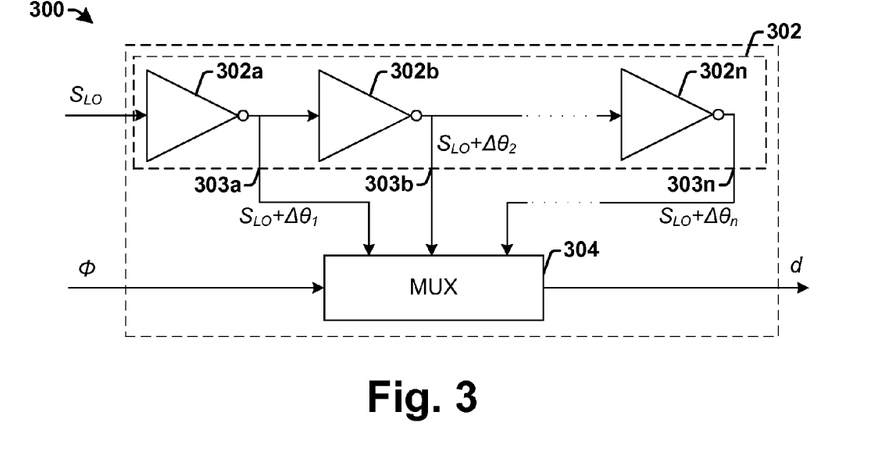
FIG. 3 is a block diagram of some embodiments of a phase modulation component disposed within a disclosed transmission chain.

FIG. 3 is a block diagram of some embodiments of a phase modulation component 300 for a disclosed transmission chain.

The phase modulation component 300 comprises a delay chain 302 comprising a plurality of delay segments 302a-302n connected in series. In some embodiments, the plurality of delay segments 302a-302n may comprise inverters. The delay chain 302 is configured to receive a local oscillator signal $S_{LO}$, which propagates through the plurality of delay segments 302a-302n. The plurality of delay segments 302a-302n are configured to introduce phase shifts into the local oscillator signal $S_{LO}$, and to generate phase shifted output signals having different phase shifts at a plurality of outputs 303 located along the delay chain 302. For example, a first output 303a is configured to provide a first phase shifted output signal having a first phase shift $S_{LO+\Delta\phi_1}$, while a second output 303b is configured to provide a second phase shifted output signal $S_{LO}+\Delta\phi_2$ having a second phase shift $\alpha\phi_2$ that is greater than the first phase shift $\Delta\phi_1$.

A multiplexer 304 is configured to receive the plurality of phase shifted output signals from the plurality of delay segments 302a-302n and a phase control signal $\phi$ (e.g., from pre-processing element 102). The phase control signal $\phi$ controls the multiplexer 304 to select an output signal from the delay chain 302. For example, depending on the value of the phase control signal ϕ, the multiplexer 304 will output a selected one of the phase shifted output signals as the digital output signal d.

Figure 4:
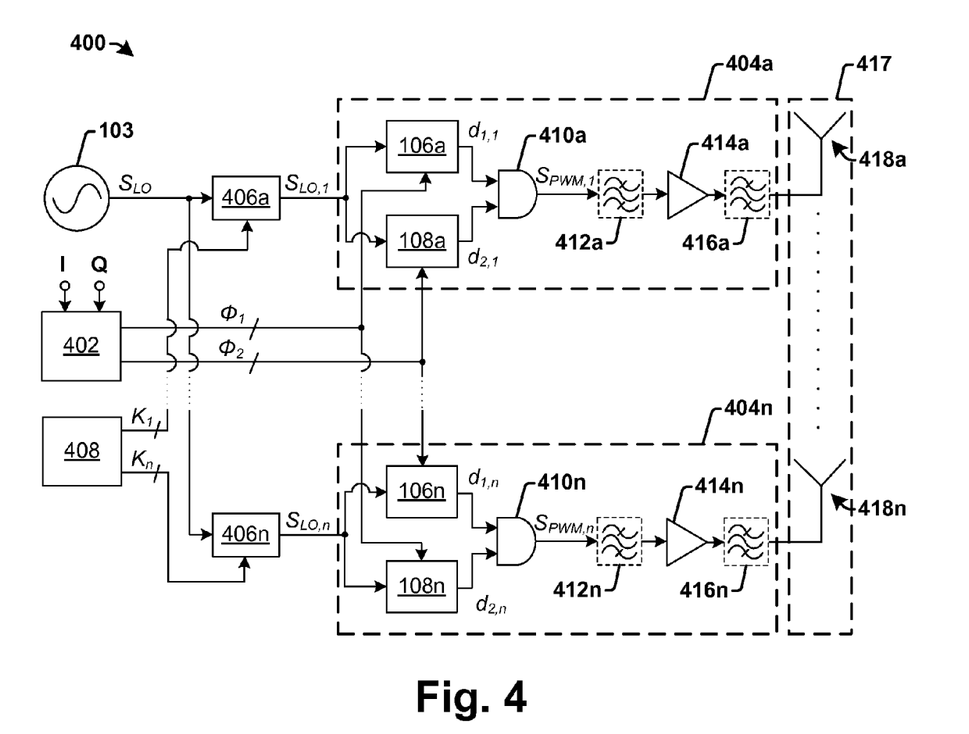
FIG. 4 is a block diagram of some embodiments of a transmission system comprising multiple transmission branches for driving a MIMO (multiple-input, multiple-output) antenna array.

FIG. 4 is a block diagram of some embodiments of a transmission system 400 comprising a plurality of transmission branches (i.e., transmission chains) for driving a MIMO (multiple-input, multiple-output) antenna array.

The transmission system 400 comprises a plurality of transmission branches 404a-404n (i.e., transmission chains) configured to generate separate RF-PWM signals $S_{PWM,n}$. The plurality of transmission branches 404a-404n are coupled in parallel to a pre-processing element 402 and to a local oscillator 103 configured to generate a local oscillator signal $S_{LO}$. The pre-processing element 402 is configured to receive an digital baseband signal comprising in-phase (I) and quadrature phase (Q) components, and from the digital baseband signal to generate a first control signal $\phi_1$ and a second control signal $\phi_2$.

A plurality of phase delay elements 406a-406n are arranged between the local oscillator 103 and the plurality of transmission branches 404a-404n. The plurality of phase delay elements 406a-406n are configured to receive the local oscillator signal $S_{LO}$ and to introduce phase shifts into the local oscillator signal $S_{LO}$ to generate modified local oscillator signals $S_{LO,n}$ having different phases. In some embodiments, a control unit 408 is configured to generate separate phase delay control signals, $K_1$-$K_n$, that are respectively provided to the phase delay elements 406a-406n, so that each of the phase delay elements 406a-406n are controlled by a separate phase delay control signal $K_i$. For example, a first phase delay control signal $K_1$ is provided to phase delay element 406a and a second phase delay control signal $K_n$ is provided to phase delay element 406n. In some embodiments, the phase delay control signals, $K_1$-$K_n$, may comprise multi-bit digital signals.

A modified local oscillator signal $S_{LO,n}$, the first control signal $\phi_1$, and second control signal $\phi_2$, are provided to each of the plurality of transmission branches 404a-404n. For example, a first modified local oscillator signal $S_{LO,1}$, the first control signal $\phi_1$, and the second control signal (hare provided to the first transmission branch 404a and a second modified local oscillator signal $S_{LO,n}$, the first control signal $\phi_1$, and the second control signal $\phi_2$ are provided to the nth transmission branch 404n. Each of the plurality of transmission branches 404a-404n comprise a first phase modulation component 106 and a second phase modulation component 108. The first phase modulation component 106 and the second phase modulation component 108 within a same transmission branch 404 are configured to receive a modified local oscillator signal $S_{LO,n}$ from a phase delay element 406. The first phase modulation component 106 is further configured to receive the first control signal $\phi_1$, and the second phase modulation component 108 is further configured to receive the second control signal $\phi_2$.

The first phase modulation component 106 is configured to introduce a first phase shift into the modified local oscillator signal $S_{LO,n}$ depending upon a value of the first control signal $\phi_1$. The second phase modulation component 108 is configured to introduce a second phase shift into the modified local oscillator signal $S_{LO,n}$ depending upon a value of the second control signal $\phi_2$. The first and second phase modulation components, 106 and 108, are configured to output the phase shifted signals as 1-bit digital signals, $d_1$ and $d_2$, having values that correspond to a phase of the digital baseband signal.

In some embodiments, first and second control signals, $\phi_1$ and $\phi_2$, provided to each of the plurality of transmission branches 404a-404n are the same so that every transmission branch outputs a phase shifted version (depending on the phase delay introduced by phase delay element 406) of the digital baseband signal. In such embodiments, the first phase modulation components 106a-106n will introduce a same first phase modulation, and the second phase modulation components 108a-108n will introduce a same second phase modulation.

The first and second 1-bit digital signals, $d_1$ and $d_2$, are provided to an AND gate 410. The AND gate 410 is configured to combine the first and second 1-bit digital signals, $d_1$ and $d_2$, to form an RF-PWM signal $S_{PWM}$. In some embodiments, the output of the AND gate 410 is coupled to an upstream filtering element 412 (e.g., a bandpass filter). The upstream filtering element 412 is configured to filter the RF-PWM signal $S_{PWM}$ to remove energy outside of the vicinity of the carrier frequency (e.g., energy at twice the carrier frequency, three-times the carrier frequency, etc.), which can damage subsequent power amplifier operation and/or violate spectrum masks in communication standards. In some embodiments, the upstream filtering element 412 may comprise a bandpass filter.

The output of the filtering element 412 is amplified by a power amplifier 414 configured to increase a power of the signal. In some embodiments, a downstream filtering element 416 (e.g., a bandpass filter), which is located downstream of the power amplifier 414, may be used instead of the upstream filtering element 412 to filter the output of the power amplifier 414. The amplified signal is provided to an antenna 418 within a multi-antenna array 417. In various embodiments, the multi-antenna array 417 may comprise a MIMO antenna array or a massive MIMO antenna array (i.e., a very large MIMO) having hundreds or thousands of antennas that are operated fully coherently and adaptively. Since each of the plurality of transmission branches 404a-404n receives a modified local oscillator signal $S_{LO,n}$ having different phases, the RF-PWM signals $S_{PWM}$ output by the transmission branches 404a-404n will have specific phases, which are superimposed upon each other (i.e., to constructively interfere at the location of the beam and to destructively interfere in other locations) to enable a beam steering functionality.

The relatively simple and low-cost architecture of the transmission branches 404a-404n allows for the system 400 to be used with the multi-antenna array 417 in a manner that is cost effective. Furthermore, when used to drive the multi-antenna array 417, the system 400 is able to generate signals with lower in-band signal noise. This is because the individual phases generated by the phase delay elements 406 cause different nonlinear distortions in the phase modulators, 106 and 108. Depending on the phases generated by the phase delay element 406, the individual phases caused by the phase-modulators, 106 and 108, are more or less statistically un-correlated nonlinear distortion, such that constructive interference of the individual RF data streams in the air causes the distortion power to increase slower than the in-band power, resulting in a reduction in out-of-band distortion in the intended direction on the receiver side.

Figure 5A:
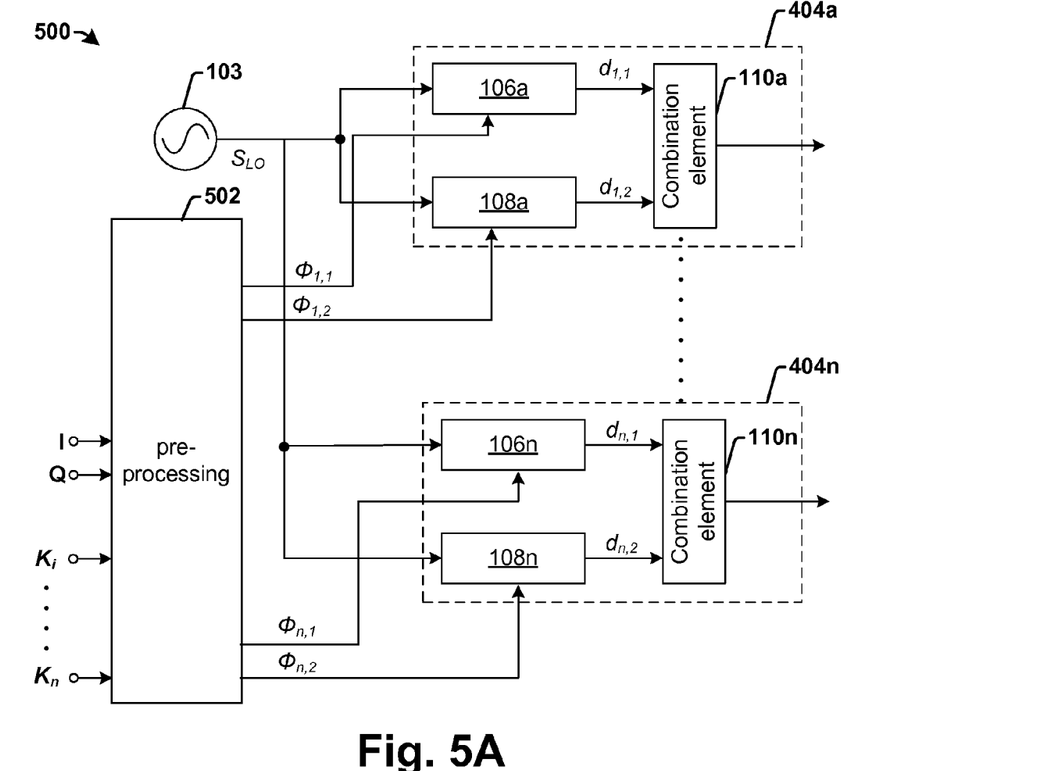
FIGS. 5A-5B show block diagrams of some alternative embodiments of a transmission system comprising multiple transmission branches for driving a MIMO antenna array.
Figure 5B:
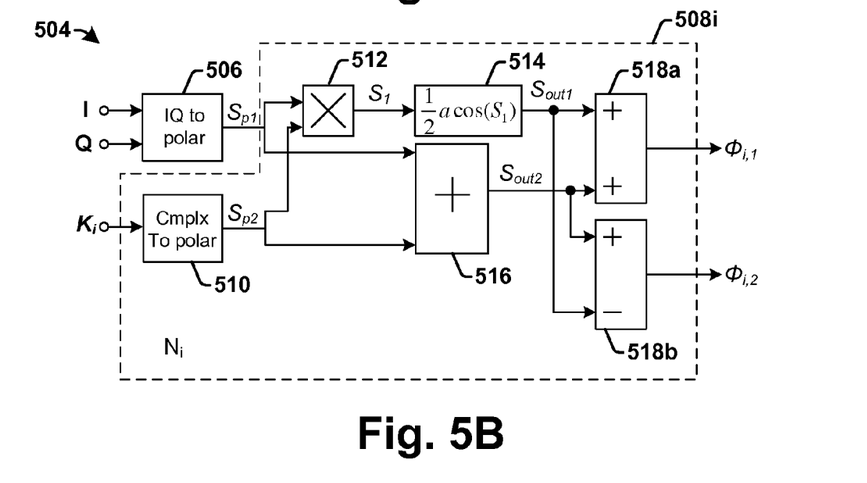

FIGS. 5A-5B show block diagrams of some alternative embodiments of a transmission system having a plurality of transmission branches for driving a MIMO antenna array.

FIG. 5A is a block diagram of some embodiments of a transmission system 500 comprising a plurality of transmission branches for driving a multi-antenna array.

The system 500 comprises a plurality of transmission branches 404a-404n coupled in parallel to a pre-processing element 502 and to a local oscillator 103 configured to generate a local oscillator signal $S_{LO}$. The pre-processing element 502 is configured to receive a digital baseband signal comprising in-phase (I) and quadrature phase (Q) components, and phase delay control signals, $K_1$-$K_n$. From the digital baseband signal and the phase delay control signals, $K_1$-$K_n$, the pre-processing element 502 is configured to generate a plurality of sets of two control signals, respectively comprising a first control signal $\phi_{n,1}$ and a second control signal $\phi_{n,2}$. A set of two control signals that are provided to each of the plurality of transmission branches 404a-404n.

The sets of two control signals cause the phase modulation components, 106 and 108, within each of the plurality of transmission branches 404a-404n to introduce different phase shifts into the local oscillator signal $S_{LO}$. For example, a first control signal $\phi_{1,1}$ is provided to phase modulation components 106a and a second control signal $\phi_{1,2}$ is provided to phase modulation components 108a. The separate sets of two control signals cause the plurality of transmission branches 404a-404n to generate phase shifted an RF-PWM signals that correspond to the phase-shifted and magnitude scaled digital baseband signal. Therefore, the separate sets of two control signals enabled beam forming functionality without separate phase delay elements, as show in transmission system 400. Furthermore, the two separate sets of control signals allow for additional scaling of the magnitudes of the individual transmission branches 404a-404n, thereby providing increased flexibility to shape the beam forming pattern.

FIG. 5B is a block diagram of some embodiments of a pre-processing element that may be used in transmission system 500.

The pre-processing element 504 comprises a first conversion block 506 connected to a plurality of signal generation elements 508i, wherein i=1 to n. The first conversion block 506 may be configured to convert an IQ baseband signal to a first polar signal $S_{p1}$. The plurality of signal generation elements 508 are configured to receive the first polar signal $S_{p1}$ from the first conversion block 506 and a phase delay control signal $K_i$.

Respective ones of the plurality of signal generation elements 508i comprise a second conversion block 510 configured to convert the phase delay control signal $K_i$ from a complex number to a second polar signal $S_{p2}$. A multiplier 512 is configured to multiply the first and second polar signals, $S_{p1}$ and $S_{p2}$, to generate a signal $S_1$ that is operated upon by a first arithmetic unit 514 to generate a first output signal $S_{out1}$. In some embodiments, the first arithmetic unit 514 is configured perform a function equal to $\frac{1}{2}\cos^{-1}(S_1)$, which generates a first output signal $S_{out1}$. This function allows for a phase shift, which corresponds to an magnitude scaling, to be introduced separately into each of the transmission branches, thereby giving the pre-processing unit 504 the ability to optimize the beam pattern of a multiple antenna array (e.g., MIMO antenna array). A second arithmetic unit 516 is configured to add the first and second polar signals, $S_{p1}$ and $S_{p2}$, to generate a second output signal $S_{out2}$.

An addition element 518a is configured to add the first and second output signals, $S_{out1}$ and $S_{out2}$, to generate a first control signal while a subtraction element 518b is configured to subtract the second output signal $S_{out2}$ from the first output signal $S_{out1}$ to generate a second control signal $\phi_{i,2}$.

Figure 6A:
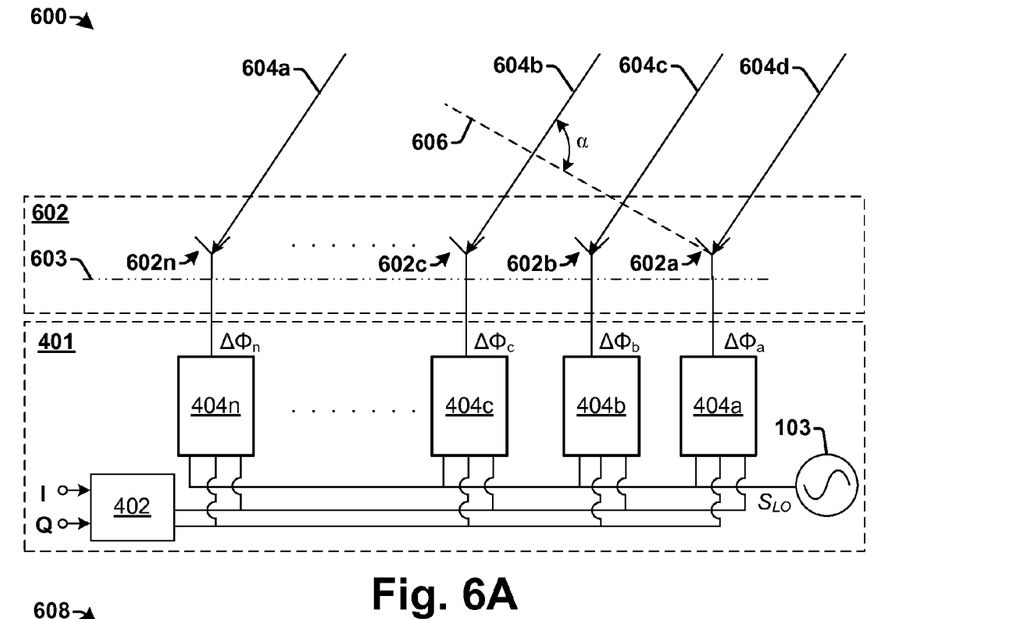
FIGS. 6A-6B illustrate some embodiments of linear MIMO antenna array driven by a disclosed transmission system.
Figure 6B:
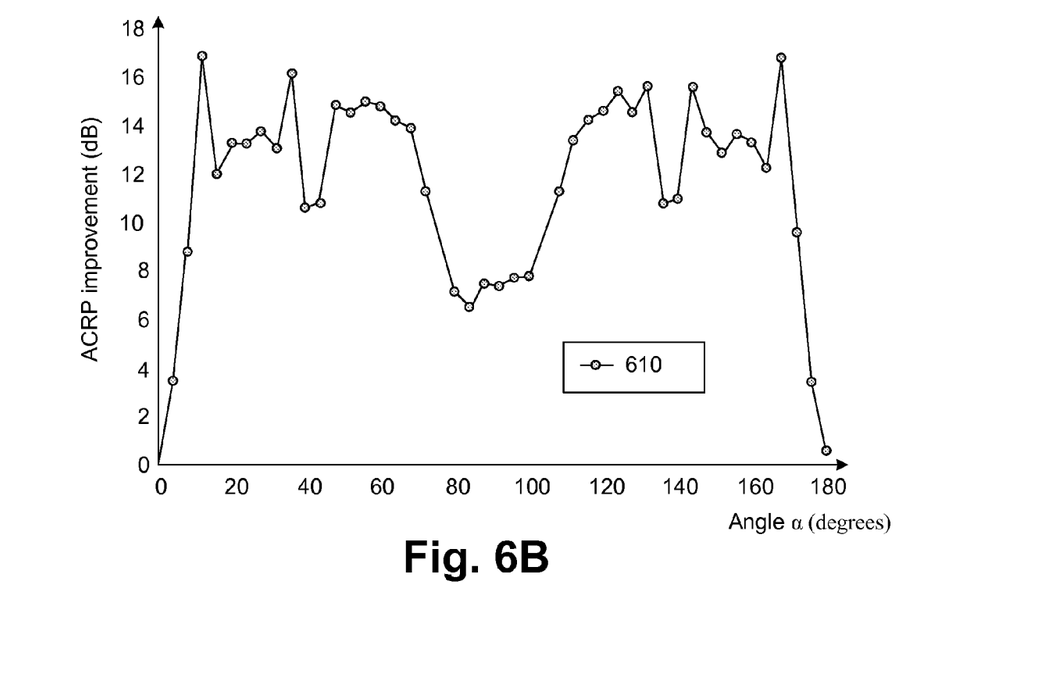

FIGS. 6A-6B illustrate some embodiments of linear MIMO antenna array driven by the disclosed transmission system. Although FIGS. 6A-6B are illustrated with respect to the transmission system of FIG. 4, it will be appreciated that the linear MIMO antenna array is not limited to such a transmission system.

FIG. 6A shows some embodiments of a block diagram of a transmission system 600 comprising a linear MIMO antenna array 602 connected to a disclosed transmission chain 401.

As shown in transmission system 600, the linear MIMO antenna array 602 comprises a plurality of antennas 602a-602n that are coupled to a transmission system 401 having different transmission branches 404a-404n. The plurality of antennas 602a-602n are disposed in a linear arrangement (e.g., along line 603). The different transmission branches 404a-404n are configured to generate a plurality of digital PWM signals that drive the different antennas 602a-602n with different phases Δφa-Δφn, so as to constructively add the energy in a certain direction.

FIG. 6B illustrates a graph 608 showing an ACPR (adjacent channel power ratio) gain improvement 610 for ten antennas arranged in a linear array. The graph 608 illustrates the ACPR gain improvement 610 as a function of angle α of a beam relative to a wave front 606. As shown in graph 608, the linear MIMO antenna array 602 provides for relatively good ACPR gain improvement 610 for 0°<α<180°. However, at angles of a that are equal to 0° and 180° the linear MIMO antenna array 602 provides for relatively no ACPR gain improvement 610. This is because all phase modulation components within the transmission system 401 are driven with a same local oscillator phase and therefore the generated non-linear distortion in all transmitters are correlated.

Figure 7A:
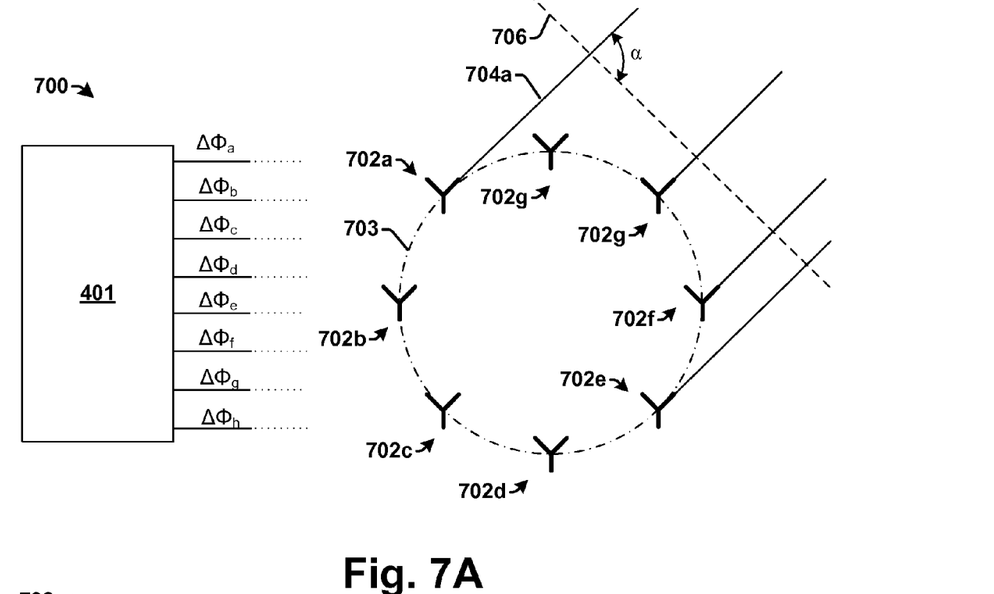
FIGS. 7A-7B illustrate some embodiments of a circular MIMO antenna array driven by the disclosed transmission system.
Figure 7B:
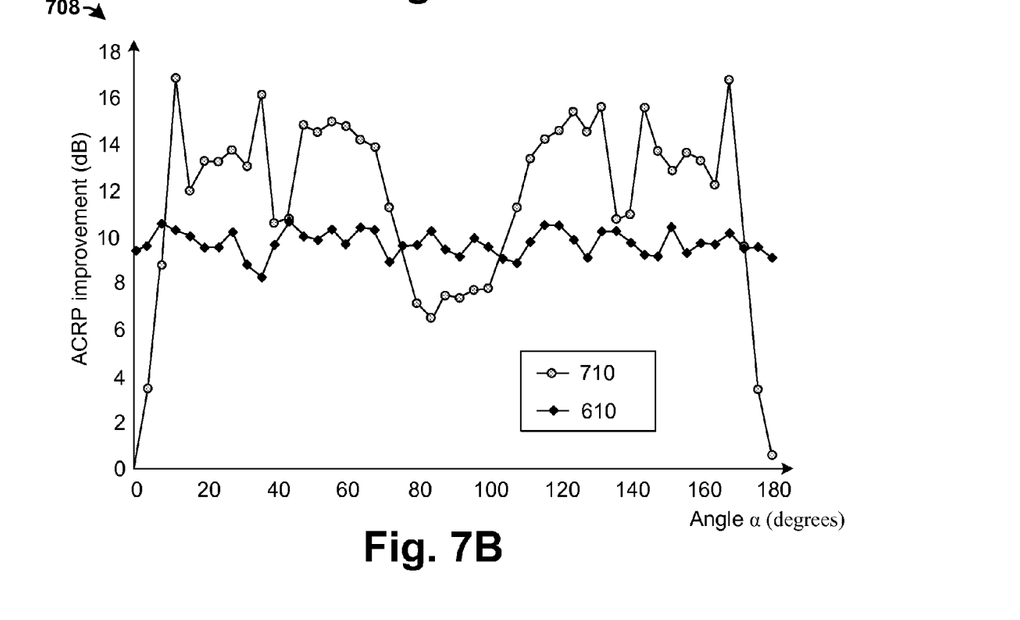

FIGS. 7A-7B illustrate some embodiments of circular MIMO antenna array driven by the disclosed transmission system. Although FIGS. 7A-7B are illustrated with respect to the transmission system of FIG. 4, it will be appreciated that the linear MIMO antenna array is not limited to such a transmission system.

FIG. 7A shows some embodiments of a block diagram of a transmission system 700 comprising a circular MIMO antenna array 702 connected to a disclosed transmission chain 401.

As shown in system 700, the circular MIMO antenna array 702 comprises a plurality of antennas 702a-702h that are coupled to a transmission system 401 having different transmission branches (not shown). The plurality of antennas 702a-702h are disposed in a circular arrangement (e.g., along line 703). The transmission system 401 is configured to generate a plurality of digital PWM signals that drive the different antennas 702a-702h with different phases Δφa-Δφh, so as to constructively add the energy in a certain direction.

FIG. 7B illustrates a graph 708 showing an ACPR (adjacent channel power ratio) gain improvement 710 for ten antennas arranged in a circular array. The graph 708 illustrates the ACPR gain improvement 710 as a function of angle α of a beam relative to a wave front 706. As shown in graph 708, the circular MIMO antenna array 702 provides for ACPR gain improvement 710 of approximately 10 log (N) for 0°≤φ≤180°, where N=10 (the number of antennas in the circular array). This is because the circular MIMO antenna array 702 does not provide for identical phases for all transmitters/antennas.

Although FIGS. 6A and 7A illustrate two configurations of antenna arrays, it will be appreciated that the illustrated antenna arrays are not limiting embodiments. Rather, in other embodiments, the antenna array connected to the disclosed transmission chain may comprise alternative array configurations, such as a hexagonal shaped array or even a three dimensional shaped array, for example.

Figure 8:
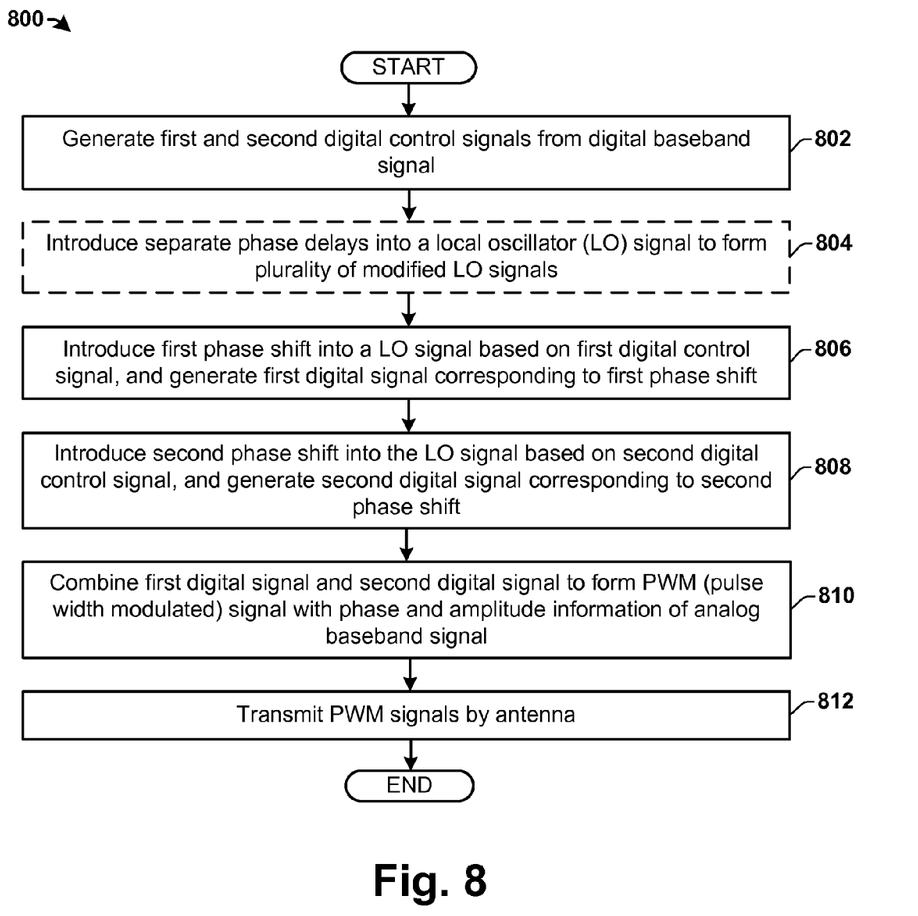
FIG. 8 is a flow diagram of some embodiments of a method of using phase modulation to generate an RF-PWM signal from a digital baseband signal.

FIG. 8 is a flow diagram of some embodiments of a method of using phase modulation to generate an RF-PWM signal from a digital baseband signal.

It will be appreciated that while method 800 is illustrated and described below as a series of acts or events, the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At 802, first and second digital control signals are generated from a digital baseband signal. In some embodiments, the digital baseband signal may have an in-phase (I) component and a quadrature phase (Q) component that is 90° out of phase with the in-phase (I) component.

At 804, separate phase delays may be introduced into a local oscillator (LO) signal to form a plurality of modified LO signals, which may enable beamforming functionality, in some embodiments.

At 806, a first phase shift is introduced into a LO signal (e.g., a modified LO signal) based on the first digital control signal, and a first digital signal is generated corresponding to the first phase shift. In some embodiments, the first digital signal may comprise 1-bit digital signal and the first control signal may comprise a multi-bit digital signal having a selected based upon the phase information of the digital baseband signal.

At 808, a second phase shift is introduced into the LO signal based on the second digital control signal, and a second digital signal is generated corresponding to the second phase shift.

In some embodiments, first and second phase shifts may be introduced into the plurality of modified LO signals based on first and second digital control signals to generate first and second digital signals from each of the plurality of modified LO signals At 810, the first digital signal and the second digital signal are combined to form an RF pulse width modulated (RF-PWM) signal. The of RF-PWM signal has pulses that have positions and widths, which correspond to the phase and amplitude of the digital baseband signal.

In some embodiments, first and second digital signals corresponding to each of the plurality of modified LO signals are combined, so as to form a plurality of RF pulse width modulated (RF-PWM) signals. In such embodiments, the plurality of RF-PWM signals may have phase offsets relative to one another due to the phase delays introduced at 804.

At 812, the RF-PWM signal is transmitted by an antenna as electromagnetic radiation. In some embodiments, the plurality of RF-PWM signals are transmitted by separate antennas of a multiple antenna array (e.g., a MIMO antenna array and/or a massive MIMO antenna array).

It will be appreciated that equivalent alterations and/or modifications may occur to those skilled in the art based upon a reading and/or understanding of the specification and annexed drawings. The disclosure herein includes all such modifications and alterations and is generally not intended to be limited thereby. For example, although the disclosed system is illustrated as having two offset correction circuits and two feedback loops, one of ordinary skill in the art will appreciate that a disclosed system may comprise more than two offset correction circuits and/or feedback loops.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions.

What is claimed is:

1. A transmission system, comprising:
   a pre-processing element configured to generate a first digital control signal and a second digital control signal from a digital baseband signal;
   a first phase modulation component configured to introduce a first phase shift into a first local oscillator (LO) signal based upon the first control signal and to generate a first digital signal corresponding to the first phase shift;
   a second phase modulation component configured to introduce a second phase shift into the first LO signal based upon the second control signal and to generate a second digital signal corresponding to the second phase shift;
   a first combination element configured to combine the first digital signal and the second digital signal to generate a first radio frequency pulse width modulated (RF-PWM) signal;
   a third phase modulation component configured to introduce a third phase shift into a second LO signal based upon the first control signal and to generate a third digital signal corresponding to the first phase shift;
   a fourth phase modulation component configured to introduce a fourth phase shift into the second LO signal based upon the second control signal and to generate a fourth digital signal corresponding to the second phase shift; and
   a second combination element configured to combine the third digital signal and the fourth digital signal to generate a second RF-PWM signal.

2. The transmission system of claim 1, wherein the first phase shift is equal to the third phase shift and the second phase shift is equal to the fourth phase shift.

3. The transmission system of claim 1, further comprising:
   a first antenna coupled to the first combination element and configured to transmit the first RF-PWM signal; and
   a second antenna coupled to the second combination element and configured to transmit the second RF-PWM signal.

4. The transmission system of claim 3, wherein the first antenna and the second antenna are disposed within a circular MIMO (multi-input, multi-output) antenna array.

5. The transmission system of claim 1, further comprising:
   a local oscillator configured to generate a LO signal;
   a first phase delay element coupled to the local oscillator and configured to introduce a first phase delay into the LO signal to generate the first LO signal; and a second phase delay element coupled to the local oscillator and configured to introduce a second phase delay into the LO signal to generate the second LO signal.

6. The transmission system of claim 5, further comprising:
a control unit comprising circuitry configured to generate a first phase delay control signal that is provided to the first phase delay element to control a first value of the first phase delay, and to generate a second phase delay control signal that is provided to the second phase delay element to control a second value of the second phase delay.

7. The transmission system of claim 1, wherein the first digital signal and the second digital signal are 1-bit digital signals having an even duty cycle and the first RF-PWM signal is a 1-bit digital signal having an uneven duty cycle.

8. The transmission system of claim 1, further comprising:
a power amplifier configured to amplify the first radio frequency pulse width modulated (RF-PWM) signal output from the first combination element; and
a filtering element disposed upstream or downstream of the power amplifier.

9. The transmission system of claim 1, wherein the digital baseband signal comprises an in-phase (I) component and a quadrature phase (Q) component.

10. A multiple-antenna transmission system, comprising:
a pre-processing element configured to generate a first digital control signal and a second digital control signal from a digital baseband signal;
a plurality of phase delay elements configured to introduce separate phase delays into a local oscillator (LO) signal to generate a plurality of modified LO signals;
a plurality of transmission branches respectively configured to receive one of the plurality of modified LO signals, to modulate phases of the one of the plurality of modified LO signals based on the first and second digital control signals, to generate first and second digital signals corresponding to the modulated phases, and to combine the first and second digital signals to form radio frequency pulse width modulated (RF-PWM) signals; and
an antenna array comprising a plurality of antennas coupled to the plurality of transmission branches and configured to transmit one of the RF-PWM signals.

11. The system of claim 10, wherein the plurality of transmission branches respectively comprise:
a first phase modulation component configured to introduce a first phase shift into a first modified LO signal based upon the first control signal and to generate a first digital signal corresponding to the first phase shift;
a second phase modulation component configured to introduce a second phase shift into the first modified LO signal based upon the second control signal and to generate a second digital signal corresponding to the second phase shift; and
a combination element configured to combine the first digital signal and the second digital signal to generate a RF-PWM output signal.

12. The system of claim 11, wherein the first phase modulation component comprises:

a delay chain comprising a plurality of delay segments connected in series and configured to generate a plurality of phase shifted output signals by introducing phase shifts into a modified LO signal; and
a multiplexer configured to receive the plurality of phase shifted output signals from the plurality of delay segments and to output one of the plurality of phase shifted output signals based upon a control signal.

13. The system of claim 10, further comprising:
a control unit comprising circuitry configured to generate a plurality of phase delay control signals that are provided to the plurality of phase delay elements to control values of the phase delays introduced into the LO signal by the plurality of phase delay elements.

14. The system of claim 10, wherein the first and second digital signals are 1-bit digital signals having an even duty cycle and the RF-PWM signals are a 1-bit digital signals having an uneven duty cycle.

15. The system of claim 14, wherein the duty cycle of the RF-PWM corresponds to an amplitude of the digital baseband signal.

16. A method of transmitting a wireless signal, comprising:
generating a first digital control signal and a second digital control signal from a digital baseband signal;
introducing a first phase shift into a local oscillator (LO) signal based on the first digital control signal and generating a first digital signal corresponding to the first phase shift;
introducing a second phase shift into the LO signal based on the second digital control signal and generating a second digital signal corresponding to the second phase shift;
combining the first and second digital signals to generate a radio frequency pulse width modulated (RF-PWM) signal;
introducing separate phase delays into the LO signal to generate a plurality of modified LO signals;
modulating phases of the plurality of modified LO signals based on the first digital control signal and the second digital control signal to generate separate first and second digital signals for each of the modified LO signals;
combining the separate first and second digital signals to generate a plurality of RF-PWM signals; and
transmitting the plurality of RF-PWM signals by separate antennas of an antenna array.

17. The method of claim 16, further comprising:
introducing separate phase delays into the LO signal prior to introducing the first phase shift and the second phase shift.

18. The method of claim 16, further comprising:
introducing separate phase delays into the LO signal concurrent to introducing the first phase shift and the second phase shift.

* * * * *